United States Patent [19]

Figueroa

[11] Patent Number: 5,095,651
[45] Date of Patent: Mar. 17, 1992

[54] MULTIPLE PURPOSE RECEPTACLE

[76] Inventor: Luisito A. Figueroa, c/o Excel Products, Inc. Suite 504 Jovan Condominium 600 Shaw Boulevard, Mandaluyong, Metro Manila, Philippines

[21] Appl. No.: 728,971
[22] Filed: Jul. 12, 1991
[51] Int. Cl.⁵ ............................................... A01G 9/02
[52] U.S. Cl. ............................................... 47/66
[58] Field of Search ............ 52/DIG. 9; 29/432, 416; 220/677, 692, 5 R; 47/34

[56] References Cited

U.S. PATENT DOCUMENTS

| | | |
|---|---|---|
| 2,140,996 | 12/1938 | Heifetz ........................... 47/66 |
| 3,621,611 | 10/1970 | Wingerter ....................... 47/66 |
| 4,785,577 | 11/1988 | Lederbauer ..................... 47/33 |
| 4,932,157 | 6/1990 | Shimp ............................. 47/25 |

Primary Examiner—David A. Scherbel
Assistant Examiner—Michele A. Van Patten
Attorney, Agent, or Firm—Julian Caplan

[57] ABSTRACT

A worn vehicle tire is formed into a multi-purpose receptacle. A section of the tire is formed by first slicing the tire along the circumferential axis thereof and then making two transverse cuts. The opposed free ends of this piece are joined by metal straps or other fasteners. A bottom, preferably also made of a portion of a vehicle tire, is set into the receptacle.

9 Claims, 2 Drawing Sheets

MULTIPLE PURPOSE RECEPTACLE

BACKGROUND OF THE INVENTION

1. Field of the Invention

The present invention broadly relates to improvements and/or innovations in the field of receptacle construction. More particularly, it relates to a multi-purpose receptacle which may be used as a plant or flower pot or stand, a floor-type ash tray, a waste basket, etc., said receptacle being preferably formed by utilizing discarded, worn-out pneumatic motor vehicle tires.

2. Description of Related Art

Wingerter U.S. Pat. No. 3,621,611 shows using discarded pneumatic tires as a container for plants and other materials. In that reference the metal vehicle wheel is kept intact with the vehicle tire assembled thereon. The size of the container is determined totally by the size of the original tire. In the present invention the receptacle may be between one-eighth and three-quarters of the size of the original tire. Additionally, in the present invention, the body of the receptacle has a substantially cylindrical upper portion and a downward converging lower portion, a shape quite different from that of Wingerter.

Lederbauer U.S. Pat. No. 4,785,577 shows a noise absorbing wall made of worn tires used as a planter. However, the structure and method of applicant are quite different from the structure shown in this reference.

SUMMARY OF THE INVENTION

Conventional receptacles for plants or flowers consist essentially of a round vessel which is usually made of metal or earthenware. While generally accepted with satisfaction, conventional receptacle have many pronounced disadvantages. Being made of metal or earthenware, they cannot withstand prolonged use. Further, these structures are expensive and labor-intensive to manufacture.

In the rubber tire industry, the disposal of millions of worn or old tires has been a paramount problem. Some of these tires are recycled for use as playground equipment. Some are ground up, and the rubber is reclaimed for use in new rubber products or used in asphalt for paving. Still others are used as artificial reefs on ocean bottoms to provide havens for fish or, as a shock absorber on the side of ships, boats, etc. Another method of disposing of tires is to use them as a source of energy by burning them to produce a synthetic rubber fuel containing an oxygen-rich chemical used in rockets. The latter method is extremely costly.

Research in this field has established that disposable pneumatic tires, such as those used on automobile, trucks and buses, when cut to a predetermined dimension may be formed and fashioned into a highly durable and decorative multi-purpose receptacle.

It is therefore a principal object of the invention to provide a receptacle which has a body preferably formed from a discarded motor vehicle tire.

Another object of the invention is to provide a receptacle which makes use of the old and worn pneumatic tires into a new useful article and thereby additionally enhance the disposition thereof.

Still another object of the invention is to provide a receptacle that may be readily produced in various decorative design patterns.

A further object of the invention is to provide a receptacle that is very simple and easy to construct, inexpensive to produce, sustain prolong usage and appreciably decorative.

BRIEF DESCRIPTION OF THE DRAWINGS

The object of the invention, and its characteristic features and advantages will be further seen in the description which follows, given by way of example, with reference to the accompanying drawings, in which.

DETAILED DESCRIPTION OF THE PREFERRED EMBODIMENT

Figure 1:
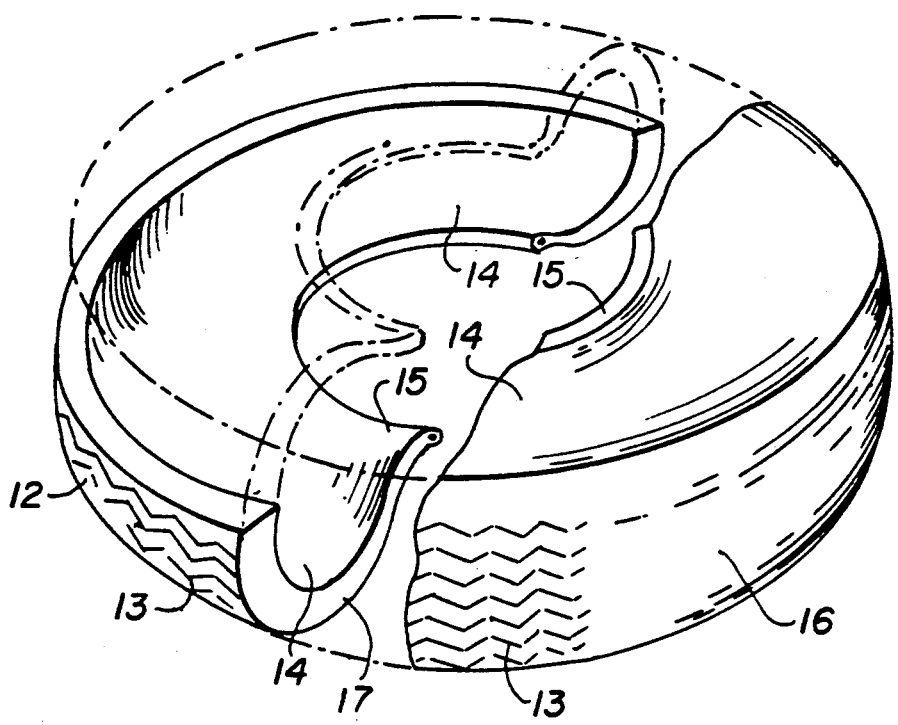
FIG. 1 is a fragmentary perspective view of a tire fabricated from a conventional worn and old motor vehicle pneumatic tire as used in the present invention.
Figure 2:
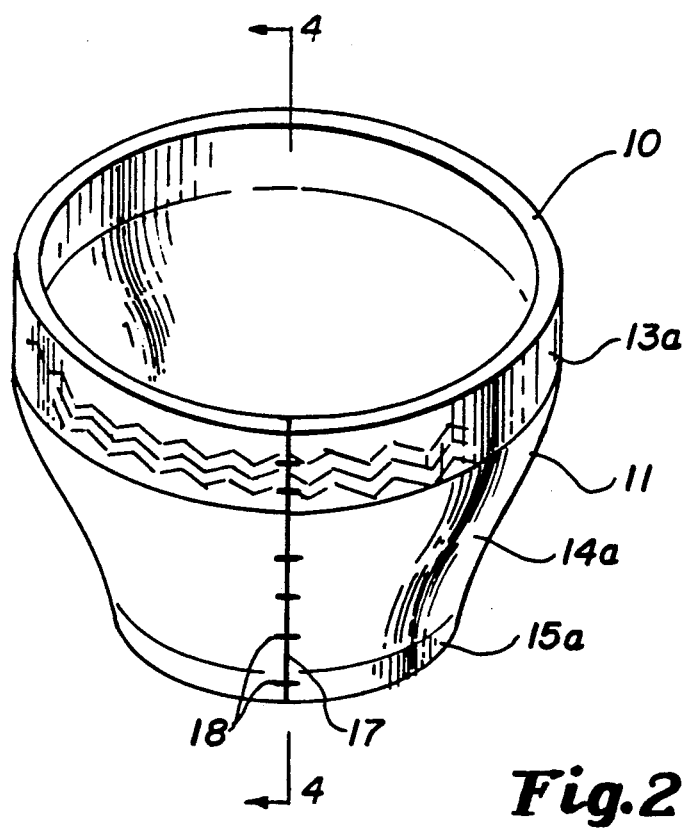
FIG. 2 is a perspective view of the multi-purpose receptacle formed from the carved-out tire as shown in FIG. 1 and embodying the invention.
Figure 3:
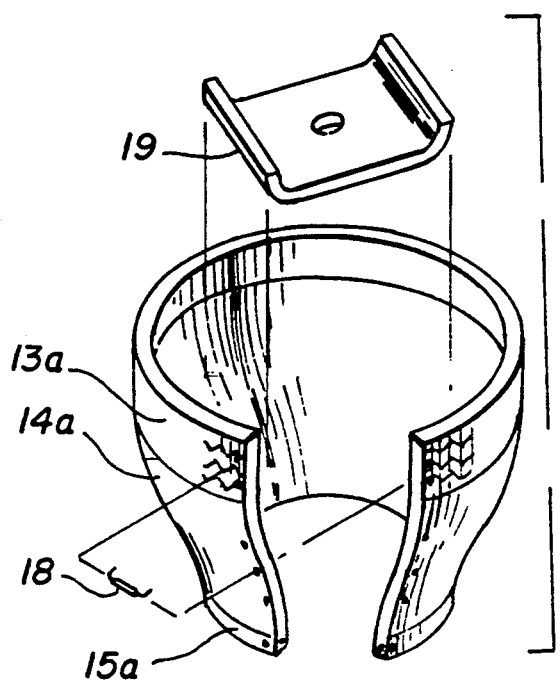
FIG. 3 is an exploded view of the receptacle shown in FIG. 2.

Referring now in greater detail to the several views of the drawing and wherein like reference numerals designate the same parts throughout, there is shown in FIG. 2 a multi-purpose receptacle generally designated by reference to numeral 10. Receptacle 10 comprises an annular body 11 fashioned and formed from a unitary piece 12 cut from a conventional pneumatic tire as shown in FIG. 1. As in conventional arrangement, piece 12 basically defines an outer circumferential tread member 13, a sidewall 14 converging with tread member 13, and a metal-reinforced rim 15 integrally formed at the terminal of said sidewall 14. As shown in FIG. 1, unitary piece 12 has been cut from the original form of the conventional pneumatic tire 16 in a predetermined dimension. In this case, piece 12 is about one-fourth of said pneumatic tire 16, although other dimension could be used if desired.

In operation, piece 12 as shown in FIG. 1 is formed by first slicing off a section of the tire 16 perpendicular to the axis of rotation of the tire and along the circumferential axis thereof and severing it transversely. This cut is preferably between one-tenth and nine-tenths of the tread width. The opposed free ends 17 are then joined by suitable metallic straps or fasteners 18 although they may also be secured together by seams or other jointing structures. Preferably, the lineal length of the unitary piece 12 ranges one-eighth to at least one-half of the circumference of the pneumatic tire 16.

Figure 4:
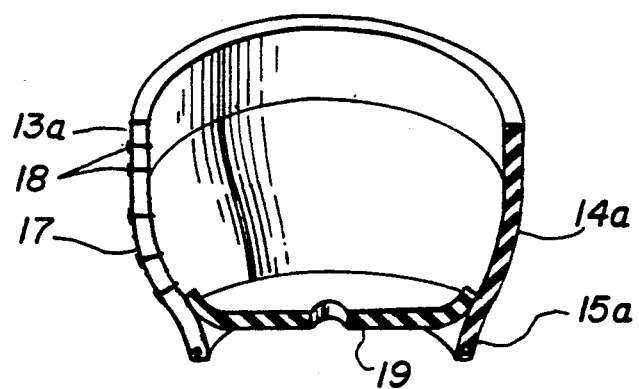
FIG. 4 is a central cross-sectional view taken along the line 4—4 of FIG. 2.

As illustrated in FIGS. 2 and 4, the body 11 of the assembled receptacle now consists of an upper tread portion 13a, an annular sidewall 14a converging downwardly from said upper tread portion 13a, and a supporting rim 15a terminating at the lower end of said sidewall 14a. Disposed within the lower portion of the sidewall 14a is a bottom wall 19. It is preferred that this bottom wall 19 also be made of discarded pneumatic tire material although wood or other suitable structure could also be used.

Figure 5:
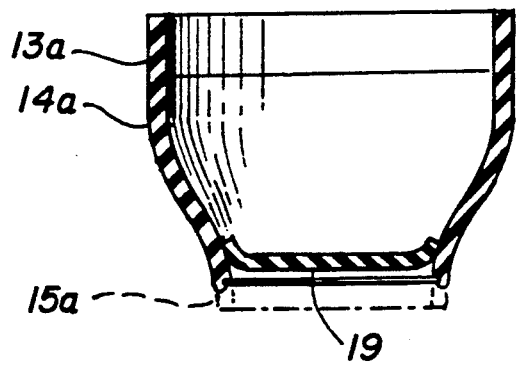
FIG. 5 is an alternative embodiment of the receptacle.

An alternative embodiment as shown in FIG. 5, the rim 15a being reinforced with metallic material has been removed to facilitate easy formation of the desired shape. In other respects the modification of FIG. 5 resembles that preceding modification and the same reference numerals are used in the drawing. Reference numeral 15a shows in dot-and-dash lines where rim 15a existed before removal.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A multi-purpose receptacle formed from a vehicle tire of the type having a circumferential central tread portion and side wall portions on either side of said tread portion, and wherein said tire has been cut with a first cut perpendicular to the axis of rotation of said tire through said tread portion and cut transversely in two second cuts perpendicular to said first cut, said receptacle comprising a hollow body, said body having two ends formed by said second cuts, means joining said two ends together to form a body of substantially lesser circumference and radius than said tire, said body having a substantially cylindrical upper portion formed by the portion of said tread portion bounded by said first and second cuts, a downward converging lower portion below said upper portion formed by one said side wall portion and a bottom edge below said lower portion, and a bottom wall having a disk and edges around said disk, said edges engaging the inside of said lower portion to close off the bottom of said body.

2. A receptacle according to claim 1 in which said bottom wall is formed from a portion of said tire discrete from said body.

3. A receptacle according to claim 1 in which said means joining said two ends comprises plural metallic fasteners through said body.

4. A receptacle according to claim 1 in which said first cut is between one-tenth an nine-tenths of the width of said tread portion.

5. A method according to claim 4 in which said first cut is made between one-tenth and nine-tenths of the tread width.

6. A method of forming a multi-purpose receptacle comprising providing a vehicle tire of the type having a circumferential central tread portion, and side wall portions on either side of said tread portion, making a first cut through said tire approximately in the middle of said tread portion perpendicular to the axis of rotation of said tire, making a second cut through said tire perpendicular to said first cut to form a first end, making a third cut through said tire perpendicular to said first cut to form a second end, joining said first and second ends together to form a body of substantially lesser circumference and radius than said tire, said body having a substantially cylindrical upper portion formed by the portion of said tread portion bounded by said first cut and one said side wall portion and a downward converging lower portion below said upper portion formed by said one side wall portion and a bottom edge, providing a disk having side edges and inserting said disk in said body, said side edges engaging the inside of said lower portion to close off the bottom of said body.

7. The product of the method of claim 6.

8. A method according to claim 6, in which said bottom wall is cut from a portion of said tire discrete from said body.

9. A method according to claim 6 in which the length of said body is between one-eighth and three-quarters of the circumference of said tire.

* * * * *